Patented June 24, 1952

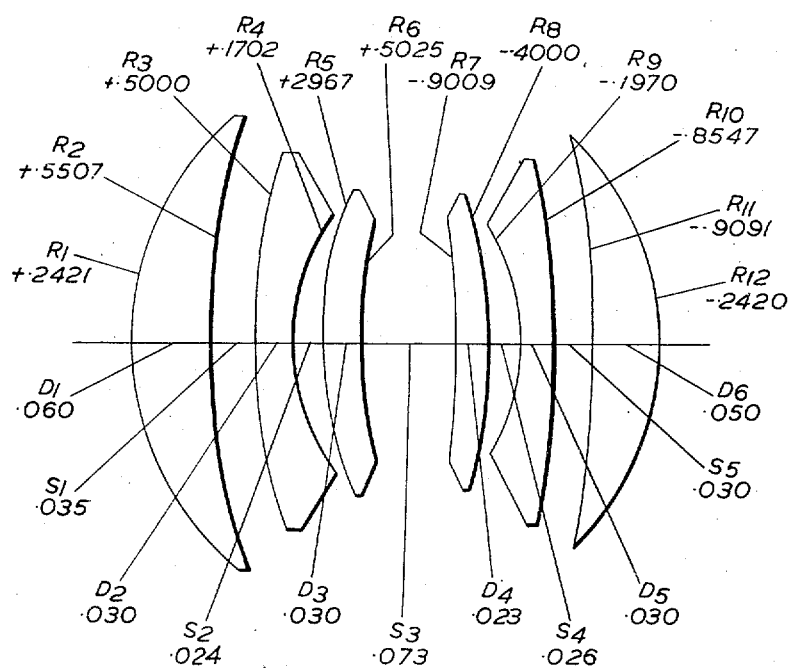

2,601,592

UNITED STATES PATENT OFFICE 2,601,592

CORRECTED OPTICAL OBJECTIVE COMPRISING SIX SIMPLE COMPONENTS AXIALLY ALIGNED AND AIR SPACED APART

Gordon Henry Cook, Leicester, England, assignor to Taylor, Taylor & Hobson Limited, Leicester, England, a British company Application March 5, 1951, Serial No. 213,833
In Great Britain February 15, 1951

19 Claims. (Cl. 88—57)

This invention relates to an optical objective, more especially for photographic purposes, corrected for spherical and chromatic aberrations, coma, astigmatism, field curvature and distortion, and comprising six simple components, three on either side of a diaphragm, the inner and outer components being convergent whilst the middle component in each half is divergent, the outer surfaces of the four convergent components and the inner surfaces of the divergent components and of the convergent inner components all being concave to the diaphragm.

The invention has for its object to provide a well-corrected objective of this type having a high relative aperture and wide covering power and also having improved correction for zonal spherical aberration and oblique spherical aberration. The invention has the further advantage that it makes it possible to have diameters larger than are needed for the axial beam alone in order to avoid the vignetting which would otherwise be objectionable with the wide angular field covered.

In the objective according to the present invention, the sum of the equivalent focal lengths of the two convergent inner components lies between 1.8F and 2.6F, where F is the equivalent focal length of the whole objective, and the arithmetic mean between the positive values of the radii of curvature of the outer surfaces of such inner components lies between .32F and .44F.

The arithmetic mean of the axial distances between the outer surfaces of the convergent outer components and the inner surfaces of the adjacent divergent components preferably lies between .08F and .17F. The arithmetic mean of the axial air separations between the divergent components and the convergent inner components and the arithmetic mean of the axial air separations between the divergent components and the convergent outer components preferably each lie between .01F and .1F.

The arithmetic mean of the positive values of the radii of curvature of the inner surfaces of the divergent components preferably lies between .11F and .25F. The outer surfaces of the divergent components are also preferably concave towards the diaphragm, the radii of curvature of such surfaces respectively lying between F/3 and 5F in the front half and between F/2 and ∞ in the rear half of the objective.

The arithmetic mean of the positive values of the radii of curvature of the outer surfaces of the convergent outer components preferably lies between .18F and .3F. The inner surfaces of such outer components are also preferably concave towards the diaphragm, the radii of curvature of such surfaces respectively lying between F/3 and 5F in the front half and between F/2 and ∞ in the rear half of the objective.

It should be made clear that the terms "front" and "rear" are used herein in accordance with the usual convention to indicate the sides of the objective respectively nearer to and further from the longer conjugate.

When the objective is to be corrected to cover a semi-angular field greater than 30 degrees, the mean refractive indices $N_1$ $N_3$ $N_4$ $N_6$ of the materials of the four convergent components preferably bear such relationship to the mean refractive indices $N_2$ $N_5$ of the materials of the two divergent components that $$(N_2+N_5)/2+.06 > (N_1+N_3+N_4+N_6)/4 > (N_2+N_5)/2-.04$$

The accompanying drawing illustrates a preferred practical example of objective according to the invention and numerical data for this example are given in the following table, in which $R_1$ $R_2$ ... represent the radii of curvature of the individual surfaces of the objective, the positive sign indicating that the surface is convex to the front and the negative sign that it is concave thereto, $D_1$ $D_2$ ... represent the axial thicknesses of the various elements and $S_1$ $S_2$ ... represent the axial air separations between the components. The table also gives the mean refractive indices $n_D$ for the D-line and the Abbé V numbers of the materials of the various elements.

| Equivalent focal length 1.000. Relative Aperture F/4.0 | | | |
|---|---|---|---|
| Radius | Thickness or Air Separation | Refractive Index $n_D$ | Abbé V Number |
| $R_1=+.2421$ | $D_1=.060$ | 1.6570 | 50.8 |
| $R_2=+.5507$ | $S_1=.035$ | | |
| $R_3=+.5000$ | $D_2=.030$ | 1.6258 | 35.7 |
| $R_4=+.1702$ | $S_2=.024$ | | |
| $R_5=+.2967$ | $D_3=.030$ | 1.6134 | 59.3 |
| $R_6=+.5025$ | $S_3=.073$ | | |
| $R_7=-.9009$ | $D_4=.023$ | 1.6098 | 58.3 |
| $R_8=-.4000$ | $S_4=.026$ | | |
| $R_9=-.1970$ | $D_5=.030$ | 1.6132 | 36.9 |
| $R_{10}=-.8547$ | $S_5=.030$ | | |
| $R_{11}=-.9091$ | $D_6=.050$ | 1.6570 | 50.8 |
| $R_{12}=-.2420$ | | | |

In this example, which is corrected to cover a wide angular field of semi-angle 35 degrees, the diaphragm is located approximately midway between the surfaces $R_6$ and $R_7$. All six components are of meniscus form with their surfaces concave to the diaphragm.

The equivalent focal length of the convergent front inner component is 1.119F and that of the rear inner component is 1.160F, so that the sum of these focal lengths is 2.279F. The arithmetic mean of the positive values of the radii $R_5$ and $R_8$ is .3483F.

The axial distances between the surfaces $R_1$ and $R_4$ and between the surfaces $R_9$ and $R_{12}$ are respectively .125F and .110F, so that their arithmetic mean is .117F. The arithmetic mean of the two outer air spaces $S_1$ and $S_5$ is .032F and that of the air spaces $S_2$ and $S_4$ is .025F.

The arithmetic mean of the positive values of the radii $R_4$ and $R_9$ is .1836F, and that of the radii $R_1$ and $R_{12}$ is .2420F.

The arithmetic mean of the mean refractive indices of the materials of the four convergent components is 1.6343 and exceeds that for the two divergent components, namely 1.6195, by .0148.

The invention makes it possible to have diameters for the various components larger than is required for the axial beam alone, and such larger diameters are very valuable in facilitating correction for oblique aberrations and contribute towards the wide angular field which can be covered by objectives according to the invention. Thus, in the example given above, the effective diameters of the individual surfaces may conveniently be .36F for $R_1$ and $R_2$, .3F for $R_3$, .2F for the chamfer of $R_4$, .24F for $R_5$, .19F for the chamfers of $R_6$ and $R_7$, .24F for $R_8$, .18F for the chamfer of $R_9$, .29F for $R_{10}$, and .33F for $R_{11}$ and $R_{12}$.

The insertion of equals (=) signs in the radius column of the table, in company with plus (+) and minus (−) signs which indicate whether the surface is convex or concave to the front, is for conformity with the patent office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

What I claim as my invention and desire to secure by Letters Patent is:

1. An optical objective corrected for spherical and chromatic aberrations, coma, astigmatism, field curvature and distortion, and comprising six simple components axially alined and air spaced apart, a diaphragm approximately in the middle of the objective having three of such components on either side thereof, the two outermost and the two innermost of such components being convergent whilst the other two are divergent, the outer surfaces of the outer components and the inner surfaces of the divergent components and the surfaces of the inner components all being concave towards the diaphragm, the sum of the equivalent focal lengths of the two convergent inner components lying between 1.8F and 2.6F where F is the equivalent focal length of the whole objective, the arithmetic mean between the positive values of the radii of curvature of the outer surfaces of such inner components lying between .22F and .44F.

2. An optical objective as claimed in claim 1, in which the arithmetic mean of the axial distances between the outer surfaces of the convergent outer components and the inner surfaces of the adjacent divergent components lies between .08F and .17F.

3. An optical objective as claimed in claim 2, in which the arithmetic mean of the axial air separations between the divergent components and the convergent inner components and the arithmetic mean of the axial air separations between the divergent components and the convergent outer components each lie between .01F and .1F.

4. An optical objective as claimed in claim 1, in which the arithmetic mean of the axial air separations between the divergent components and the convergent inner components and the arithmetic mean of the axial air separations between the divergent components and the convergent outer components each lie between .01F and .1F.

5. An optical objective as claimed in claim 1, in which the arithmetic mean of the positive values of the radii of curvature of the inner surfaces of the divergent components lies between .11F and .25F.

6. An optical objective as claimed in claim 1, in which the outer surfaces of the divergent components are concave towards the diaphragm, the radii of curvature of such surfaces respectively lying between F/3 and 5F in the front half and between F/2 and ∞ in the rear half of the objective.

7. An optical objective as claimed in claim 1, in which the outer surfaces of the divergent components are concave towards the diaphragm, the radii of curvature of such surfaces respectively lying between F/3 and 5F in the front half and between F/2 and ∞ in the rear half of the objective, the arithmetic mean of the positive values of the radii of curvature of the inner surfaces of the divergent components lying between .11F and .25F.

8. An optical objective as claimed in claim 1, in which the arithmetic mean of the positive values of the radii of curvature of the two outermost surfaces of the objective lies between .18F and .3F.

9. An optical objective as claimed in claim 1, in which the inner surfaces of the outer components are concave towards the diaphragm and their radii of curvature lie respectively between F/3 and 5F in the front half and between F/2 and ∞ in the rear half.

10. An optical objective as claimed in claim 1, in which the inner surfaces of the outer components are concave towards the diaphragm and their radii of curvature lie respectively between F/3 and 5F in the front half and between F/2 and ∞ in the rear half, the arithmetic mean of the positive values of the radii of curvature of the two outermost surfaces of the objective lying between .18F and .3F.

11. An optical objective as claimed in claim 1, in which the arithmetic mean of the positive values of the radii of curvature of the inner surfaces of the divergent components lies between .11F and .25F, and that of the outer surfaces of the convergent outer components lies between .18F and .3F.

12. An optical objective as claimed in claim 1, in which the outer surfaces of the divergent components and the inner surfaces of the convergent outer components are concave towards the diaphragm, the radii of curvature of such surfaces lying between F/3 and 5F in the front half and between F/2 and ∞ in the rear half of the objective.

13. An optical objective, corrected for spherical and chromatic aberrations, coma, astigmatism, field curvature and distortion, to cover a semi-angular field greater than 30 degrees, and comprising six simple components axially alined and air spaced apart, a diaphragm approximately in the middle of the objective having three of such components on either side thereof, the two outermost and the two innermost of such components being convergent whilst the other two are divergent, the outer surfaces of the outer components and the inner surfaces of the divergent components and the surfaces of the inner components all being concave towards the diaphragm, the sum of the equivalent focal lengths of the two convergent inner components lying between 1.8F and 2.6F where F is the equivalent focal length of the whole objective, the arithmetic mean between the positive values of the radii of curvature of the outer surfaces of such inner components lying between .22F and .44F, the materials of the components of the objective being such that $$(N_2+N_5)/2+.06 > (N_1+N_3+N_4+N_6)/4 > (N_2+N_5)/2 - .04$$

where $N_1$ $N_3$ $N_4$ $N_6$ are the mean refractive indices of the materials of the convergent components and $N_2$ $N_5$ are those of the divergent components.

14. An optical objective as claimed in claim 13, in which the arithmetic mean of the axial distances between the outer surfaces of the convergent outer components and the inner surfaces of the adjacent divergent components lies between 0.8F and .17F.

15. An optical objective as claimed in claim 13, in which the arithmetic mean of the axial air separations between the divergent components and the convergent inner components and the arithmetic mean of the axial air separations between the divergent components and the convergent outer components each lie between .01F and .1F.

16. An optical objective as claimed in claim 13, in which the outer surfaces of the divergent components are concave towards the diaphragm, radii of curvature of such surfaces respectively lying between F/3 and 5F in the front half and between F/2 and ∞ in the rear half of the objective, the arithmetic mean of the positive values of the radii of curvature of the inner surfaces of the divergent components lying between .11F and .25F.

17. An optical objective as claimed in claim 13, in which the inner surfaces of the outer components are concave towards the diaphragm and their radii of curvature lie respectively between F/3 and 5F in the front half and between F/2 and ∞ in the rear half, the arithmetic mean of the positive values of the radii of curvature of the two outermost surfaces of the objective lying between .18F and .3F.

18. An optical objective as claimed in claim 13, in which the arithmetic mean of the positive values of the radii of curvature of the inner surfaces of the divergent components lies between .11F and .25F, and that of the outer surfaces of the convergent outer components lies between .18F and .3F.

19. An optical objective as claimed in claim 13, in which the outer surfaces of the divergent components and the inner surfaces of the convergent outer components are concave towards the diaphragm, the radii of curvature of such surfaces lying between F/3 and 5F in the front half and between F/2 and ∞ in the rear half of the objective.

GORDON HENRY COOK.

REFERENCES CITED

The following references are of record in the file of this patent:

UNITED STATES PATENTS

| Number | Name | Date |
| --- | --- | --- |
| 2,031,792 | Richter | Feb. 25, 1936 |
| 2,116,264 | Hasselkus et al. | May 3, 1938 |
| 2,325,275 | Rayton | July 27, 1943 |

FOREIGN PATENTS

| Number | Country | Date |
| --- | --- | --- |
| 3,398 | Great Britain | of 1905 |
| 168,923 | Great Britain | Sept. 12, 1921 |
| 487,453 | Great Britain | June 21, 1938 |